Figure 1:
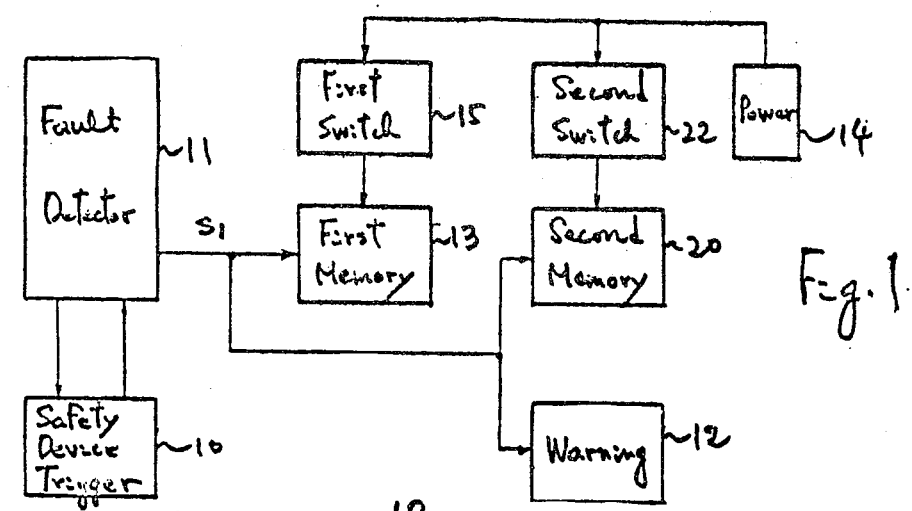

United States Patent [19]

Baba et al.

[11] 3,909,777
[45] Sept. 30, 1975

[54] FAULT RECORDER FOR TRIGGER MECHANISM OF MOTOR VEHICLE SAFETY DEVICE

[75] Inventors: Kosaku Baba; Akio Hosaka, both of Yokohama, Japan

[73] Assignee: Nissan Motor Company Limited, Yokohama, Japan

[22] Filed: Feb. 8, 1973

[21] Appl. No.: 330,669

[30] Foreign Application Priority Data
Feb. 9, 1972 Japan.................................. 47-14120

[52] U.S. Cl............. 340/52 H; 180/103; 307/10 R; 340/248 A
[51] Int. Cl. ......................................... G08b 21/00
[58] Field of Search.......... 340/52 R, 52 H, 61, 214, 340/248 A, 262; 307/10 R; 180/103; 280/150 AB

[56] References Cited
UNITED STATES PATENTS
| | | | |
|---|---|---|---|
| 3,622,974 | 11/1971 | Best et al. | 340/52 R |
| 3,629,816 | 12/1971 | Gillund | 340/52 H |
| 3,714,627 | 1/1973 | Dillman et al. | 340/52 H |

*Primary Examiner*—John W. Caldwell
*Assistant Examiner*—Joseph E. Nowicki

[57] ABSTRACT

A fault recorder which counts the time lapsed from the beginning of partial faulty conditions of the trigger of a vehicle safety device to an undesired actuation of the device and also the time from the former to a collision of the vehicle. It includes a unit for detecting the faulty conditions and a normally nonconducting transistor which is rendered conductive upon detection of such conditions. A transistor switch is provided which is connected to a trigger mechanism of the safety device to be opened upon actuation of the safety device. In order to determine the time lapsed from the detection of the beginning of partial faulty conditions to the actuation of the safety device, a recording device for recording the amount of electric charge flowing therethrough is connected in series with the normally nonconducting transistor and the transistor switch. A collision sensor is provided including a switch adapted to be opened upon sensing a collision of the vehicle. The collision switch is also connected in series with the normally nonconducting transistor and another recording device of the same type so as to determine the time lapsed from the detection of the beginning of faulty conditions to the sensing of the collision.

5 Claims, 2 Drawing Figures

FAULT RECORDER FOR TRIGGER MECHANISM OF MOTOR VEHICLE SAFETY DEVICE

This invention relates to vehicle safety devices and, more particularly, to a fault recorder for such devices that counts the time lapsed from the beginning of malfunctioning of the device to an undesired actuation of the device which is not caused by a collision of the vehicle and also the time from the former to a collision of the vehicle but without being accompanied by actuation of the safety device.

Heretofore, many safety devices have been proposed for use on vehicles. Such devices usually comprise an inflatable confinement called "gas bag" which, when actuated, is expanded to a protective condition to avoid injuries including whip-lash injuries to vehicle occupants. In protecting the occupants, the gas bag is spread out around the occupants in such a manner as to envelop their heads and shoulders, tending to obstruct the driver's view. If the safety device has become faulty and is suddenly actuated without a collision condition being sensed, then, since the driver's view is restricted, it may happen that the vehicle deviates from its intended course and comes into collision with another vehicle or a structure in the path of advance. Also, if the safety device is left faulty without subject to inspection and repair, it may fail to successfully protect the occupants from injuries at the time of a collision. The vehicle driver or owner is thus required to have the safety device repaired immediately when the device is found faulty.

The fault recorders heretofore available can provide information only on the presence or absence of malfunctioning of a safety device or on the time lapsed from the beginning of such malfunctioning to the point of time at which the recorder is examined after an undesired actuation of the safety device takes place. However, in recorders of the latter type, difficulties are experienced in determining the length of time between the beginning of malfunctioning and the undesired actuation of the device, since the examination of the recorder would usually be made a relatively long time after the safety device is undesirably actuated. It is the time lapsed from the beginning of malfunctioning to an undesired actuation of the safety device that governs placing of responsibility either on the manufacturer or the vehicle owner for an accident caused by the undesired actuation of the safety device.

It is therefore an object of the present invention to provide a fault recorder for a trigger mechanism of a vehicle safety device that provides information on the time lapsed from the beginning of malfunctioning of the mechanism to an undesired actuation of the device and also on the time from the former to the exact time at which a collision is encountered by the vehicle but with no actuation of the device being effected.

Figure 2:
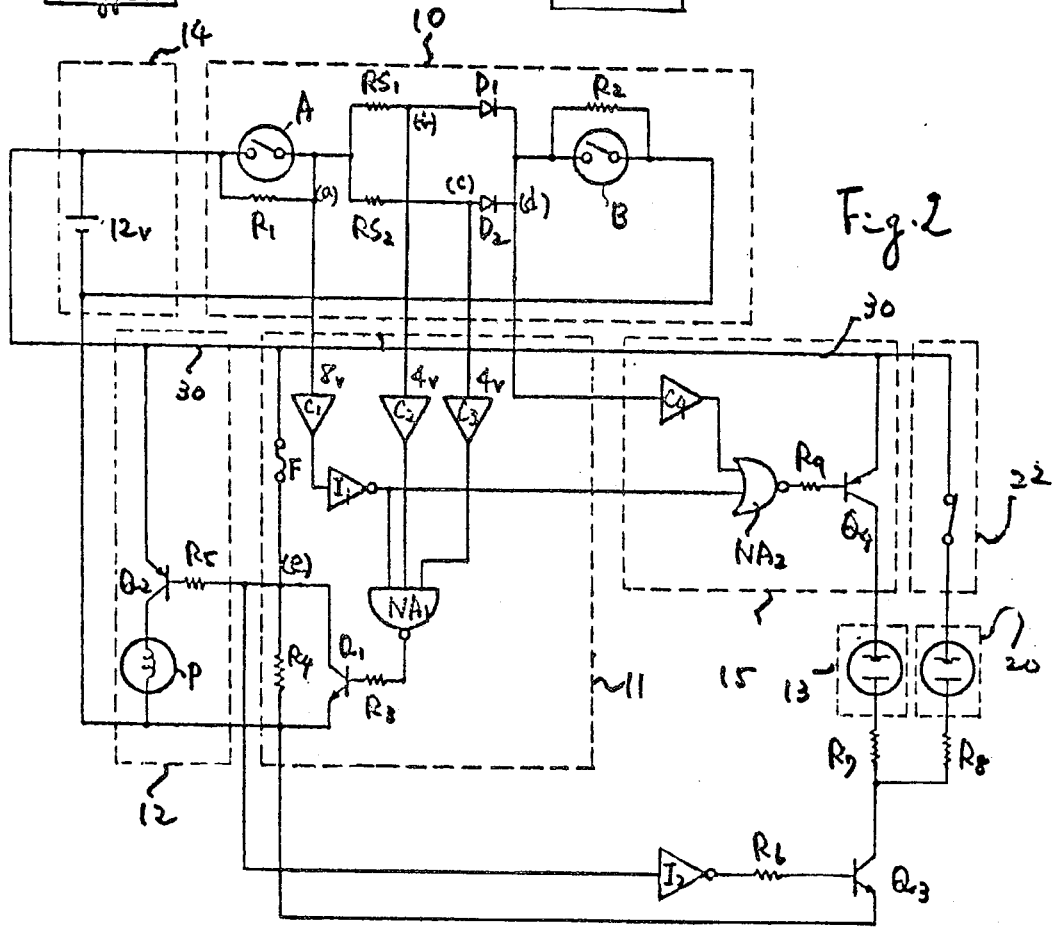
Figure 1:
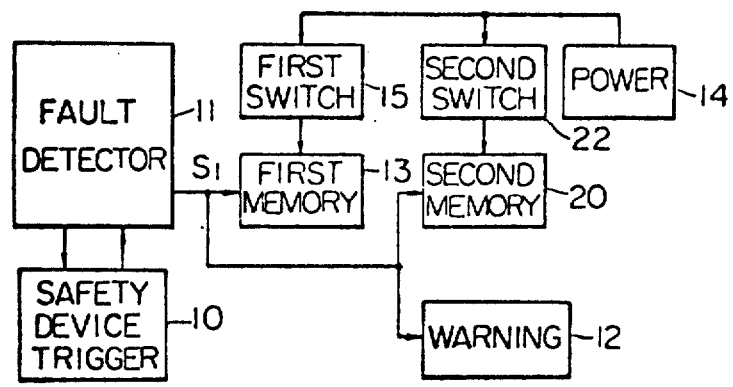
Figure 2:
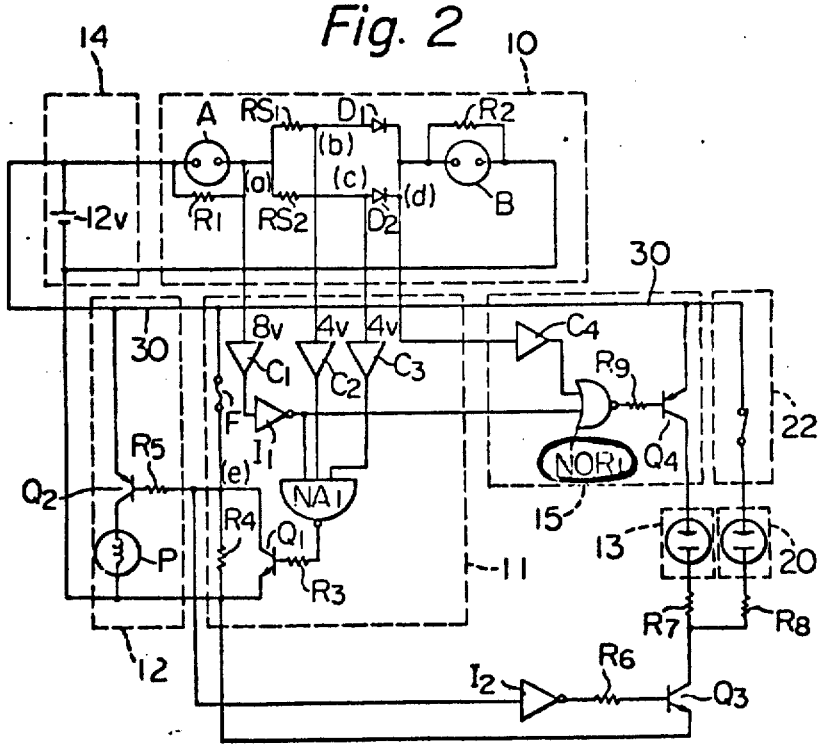

In the accompanying drawing:

FIG. 1 is a block diagram of the trigger mechanism and the fault recorder of the invention; and FIG. 2 is a circuit diagram of the trigger mechanism and the fault recorder shown in FIG. 1.

Referring now to FIG. 1, reference numeral 10 designates a trigger mechanism for a vehicle safety device (not shown) that is responsive to a collision condition of the vehicle, for actuating the safety device. The safety device may be an inflatable confinement called the "gas bag," an expansible netting or any other suitable device for protecting vehicle occupants from injuries resulting from a collision. A fault detector 11 is provided for detecting malfunctioning of the trigger mechanism and for generating a signal $S_1$ upon detection of such malfunctioning. The signal $S_1$, which indicates that the safety device trigger becomes faulty, is supplied to a warning or alarm unit 12 for giving a warning to the driver that the trigger is malfunctioning and should be repaired as soon as possible. The signal $S_1$ is also furnished to a first memory unit 13 which is connected to a power source 14 such as a battery through a first switch unit 15. The first switch unit 15 is normally closed and is operatively or electrically associated with the safety device so that it is opened upon actuation of the device. In the illustrated embodiment, the first switch unit 15 comprises an electronic switch which is connected to the trigger mechanism 10 so that upon triggering of the safety device the switch 15 is opened. Alternatively, the first switch unit 15 may be a pneumatically actuated switch which is moved to the open position by the action of pressurized gas from a gas source upon instantaneous inflation of a gas bag mounted in the vehicle. When the safety device trigger becomes faulty, causing the signal $S_1$ to be supplied to the first memory unit 13, a current path is established from the power source 14 through the first switch unit 15 to the first memory unit 13, whereby the time during which the current flows is recorded in the first memory unit 13. The first memory unit 13 is of the type capable of recording the amount of electric charge flowing therethrough by electrolysis, and is commercially available. If the current flowing through the unit 13 is kept constant, the time during which the current flows is obtained by dividing the recorded amount of electric charge by the magnitude of the current.

The signal $S_1$ that is indicative of the safety device trigger being faulty is further supplied to a second memory unit 20 of the same type as the first memory unit 13. Similarly, the second memory unit 20 is connected to the power source 14 through a second switch unit 22 of the normally closed type. The second switch unit 22 is adapted to be opened upon sensing a collision condition of the vehicle, and comprises, for example, a glass tube coated with an electrically conductive coating, which is liable to breakage when subjected to an impact resulting from a collision. When the safety device trigger becomes faulty, the second memory unit 20 is set for recording the current flow from the power source 14 through the second switch unit 22, until the second switch unit 22 is opened due to a collision of the vehicle.

Thus, with this arrangement, the time lapsed from the beginning of malfunctioning of a safety device to actuation of the device as well as the time from the former to the exact time at which a collision takes place are recorded in the first and second memory units 13 and 20, respectively. It will be appreciated that by examining the first and second memory units 13 and 20, it is possible to determine whether the manufacturer or the vehicle owner is responsible for an accident resulting from malfunctioning of the safety device trigger.

Referring to FIG. 2, there is illustrated a typical example of the fault recorder of the present invention.

The trigger mechanism 10 is shown as enclosed within a dash rectangle, and comrpises two electrically actuable detonation elements $RS_1$ and $RS_2$ which are connected in parallel to each other. While only two detonation elements are herein shown for simplicity of illustration, it should be understood that the present invention is not restricted thereto. The detonation elements are electrically actuable to explode so as to, e.g., release pressurized gas from a gas source for instantaneous inflation of the gas bag. The detonation elements $RS_1$ and $RS_2$ are connected to diodes $D_1$ and $D_2$, respectively. The trigger mechanism 10 further includes two collision sensors A and B which are connected in series with the parallel-connected detonation elements $RS_1$ and $RS_2$ and diodes $D_1$ and $D_2$ across the battery 14. The collision sensors A and B are adapted to be closed upon sensing a collision of the vehicle and both comprise, for example, a weight of magnetic material which is normally kept in contact with a stationary magnet but, at the time of a collision, is moved to engage two contacts against the attractive force of the magnet due to a rapid deceleration caused by the collision. Alternatively, the collision sensors A and B may comprise two tape-like contacts facing each other and mounted on a collapsable protruding portion of the vehicle, such as a bumper, from side to side.

Resistors $R_1$ and $R_2$ are respectively connected across their associated collision sensors A and B so as to enable the detection of the burning-out of any of the detonation elements $RS_1$ and $RS_2$ caused by explosion. The values of resistance of the resistors $R_1$ and $R_2$ are so selected that $R_1 \approx R_2 >> RS_1, RS_2$. Thus, at a time before the safety device is actuated, there is no appreciable voltage drop across the detonation elements $RS_1$, $RS_2$ and the diodes $D_1$ and $D_2$. That is, the voltages appearing at points (a), (b), (c) and (d) are approximately 6 volts, for example.

Connected to the trigger mechanism 10 is the fault detector 11 that serves to detect malfunctioning of the trigger mechanism 10. In the illustrated embodiment, the detector 11 includes three comparators $C_1$, $C_2$ and $C_3$ which are connected to the points (a), (b) and (c), respectively, and have their respective reference levels equal to 8, 4 and 4 volts as indicated in the drawing. The output of the comparator $C_1$ is connected through an invertor $I_1$ to one input of a NAND gate $NA_1$ and, on the other hand, those of the comparators $C_2$ and $C_3$ are connected directly to the other inputs of the NAND gate $NA_1$. The output of the NAND gate $NA_1$ is connected through a resistor $R_3$ to the base of a transistor $Q_1$ which is of the NPN type. The transistor $Q_1$ has its collector connected to an electric fuse F which is connected to a bus line 30 leading to the positive electrode of the battery 14. A resistor $R_4$ is connected between the collector and emitter of transistor $Q_1$. The point, indicated at (e), between the collector of the transistor $Q_1$ and the electric fuse F is connected through a resistor $R_5$ to the base of a transistor $Q_2$ which is of the PNP type. The tranistor $Q_2$ is connected at its emitter to the bus line 30 and at its collector to an electric lamp P. The electric lamp P forms a part of the warning unit 12 and is connected to the negative electrode of the battery 14 as well as to the emitter of the transistor $Q_1$.

An invertor $I_2$ is provided having its input connected to the point (e) leading to the collector of the transistor $Q_1$. The output of the invertor $I_2$ is connected through a resistor $R_6$ to the base of a transistor $Q_3$ of the NPN type, the emitter thereof being connected to the emitter of the transistor $Q_1$. The collector of the transistor $Q_3$ is connected through resistors $R_7$ and $R_8$ to the first and second memory units 13 and 20, respectively.

Shown as enclosed within a dash rectangle 15 is the first switch unit which includes a comparator $C_4$ having its input connected to the point (d) in the trigger mechanism 10. The first switch unit 15 also includes a NOR gate $NOR_1$ having one input connected to the output of the comparator $C_4$ and the other input connected to the output of the invertor $I_1$. The output of the NOR gate $NOR_1$ is connected through a resistor $R_9$ to the base of a transistor $Q_4$ which is of the PNP type. The transistor $Q_4$ has its emitter connected to the bus line 30 and its collector connected to the first memory unit 13.

The second switch unit 22 which is adapted to be opened upon sensing a collision of the vehicle is shown as connected between the bus line 30 and the second memory unit 20.

The operation of the fault recorder according to the invention is as follows: If, now, the safety device trigger mechanism becomes faulty in that one of the collision sensors A and B is short-circuited, or one of the detonation elements $RS_1$ and $RS_2$ is broken without causing an explosion, or one of the collision sensors and the detonation elements is grounded, the NAND gate $NA_1$ has a true output which renders the transistor $Q_1$ conductive. This will cause a flow of current through the electric fuse F so that the fuse is broken. Also, since the voltage at the point (e) drops to near zero, the transistor $Q_2$ is rendered conductive, causing the electric lamp P to be lighted. This means that there is a need to have the safety device repaired as soon as possible. Upon conduction of the transistor $Q_1$, the transistor $Q_3$ also is rendered conductive. If, at this time, the first and second switch units 15 and 22 are closed, the conduction of the transistor $Q_3$ causes an electric current of a given magnitude to flow through the first and second memory units 13 and 20. Since the memory units are of the type capable of recording the amount of electric charge flowing therethrough, it will be readily possible to determine the length of time during which current flows.

If the safety device is actuated by explosion of one of the operable detonation elements $RS_1$ and $RS_2$, the NOR gate $NOR_1$ has a true output which renders the transistor $Q_4$ nonconductive. This means that the first switch unit 15 is opened, thus interrupting the flow of current through the first memory unit 13. Similarly, if a collision is encountered by the vehicle, the second switch unit 22 is opened so that no further current flows through the second memory unit 20.

Thus, it will be understood that by examining the first memory unit 13 it is possible to determine the time lapsed from the beginning of partial malfunctioning of the safety device trigger to the time at which the safety device is undesirably actuated. Similarly, examination of the second memory unit 20 indicates the time lapsed from the beginning of partial malfunctioning of the safety device trigger to the time at which a collision is encountered by the vehicle.

If the time recorded in the first memory unit 13 is longer than the time specified by the manufacturer, it may safely be stated that since the vehicle owner failed to have the trigger of the safety device repaired within the time limit specified by the manufacturer, the owner is responsible for the accident which would have been brought about by the undesired actuation of the safety device. If the safety device trigger is faulty in that no actuation of the device takes place at the time of a collision, it may safely be stated that the vehicle owner is responsible for the lack of actuation, provided that the time recorded in the second memory unit 20 is longer than the time specified by the manufacturer.

What is claimed is:

1. A fault recorder for use with a vehicle safety device triggering mechanism connected across a power source for triggering a safety device of a vehicle, which provides information of the time lapsed from the beginning of a partial malfunction of the safety device triggering mechanism to an undesired actuation of the safety device and also information of the time from the former to a collision of the vehicle, the fault recorder comprising:

fault detector means connected to said safety device triggering mechanism and adapted to detect partial malfunctioning thereof to generate a signal indicative thereof;

first normally closed condition switch means connected to said safety device triggering mechanism and also to said fault detector means and responsive to actuation of the safety device to reverse switch conditions;

second normally closed condition switch means connected to said power source and responsive to a collision condition of the vehicle to reverse switch conditions;

first memory means connected to the first switch means and adapted to record the time lapsed from the beginning of the signal to the actuation of the safety device; and second memory means connected to said second switch means and adapted to record the time lapsed from the beginning of the signal to the collision of the vehicle.

2. The fault recorder as claimed in claim 1, wherein said fault detector means comprises:

first, second and third comparators each having an input connected to said safety device triggering mechanism for detecting malfunctioning thereof;

an invertor having an input connected to an output of said first comparator;

a NAND gate having three inputs connected to an output of said invertor and outputs of said second and third comparators respectively; and a normally nonconducting transistor having a base connected to an output of the NAND gate and adapted to be rendered conductive upon detection of the partial malfunctioning of said safety device triggering mechanism.

3. The fault recorder as claimed in claim 2, wherein said first normally closed condition switch means comprises:

a comparator having an input connected to the safety device triggering mechanism;

a NOR gate having a first input connected to said comparator and a second input connected to said fault detector means; and a normally conducting transistor having a base connected to an output of said NOR gate, and said NOR gate responsive to actuation of said safety device thereby to make the normally conductive transistor nonconductive.

4. The fault recorder as claimed in claim 3, wherein each of said first and second memory means comprises a recording device adapted to record an amount of electric charge flowing therethrough; and the fault recorder further comprises:

a normally nonconductive transistor having a collector connected to both said first and second memory means, an emitter connected to said power source, and a base connected to said fault detector means through an invertor and responsive to said signal generated from said fault detector means to become conducitve, resulting in thereby allowing current to flow through said second memory means.

5. The fault recorder as claimed in claim 4, further comprising a warning unit which includes;

a normally nonconductive transistor having a base connected to the collector of said normally nonconductive transistor of said fault detector means and responsive to the signal from said fault detector means thereby to be rendered conductive; and an electrical warning device connected in series with the normally nonconductive transistor of the warning unit and said power source, and energized in response to conducting condition of the normally nonconductive transistor of the warning unit.

* * * * *

UNITED STATES PATENT OFFICE
CERTIFICATE OF CORRECTION

Patent No. 3,909,777     Dated September 30, 1975

Inventor(s) Kosaku Baba et al.     Page 1 of 2

It is certified that error appears in the above-identified patent and that said Letters Patent are hereby corrected as shown below:

Cancel the illustrative figure and Figs. 1 and 2 and insert the corrected figures as shown on the attached sheet. Fig. 1 should appear as the illustrative figure.

Signed and Sealed this

*twenty-fifth* Day of *May 1976*

[SEAL]

Attest:

RUTH C. MASON
*Attesting Officer*

C. MARSHALL DANN
*Commissioner of Patents and Trademarks*